United States Patent [19]

Smith et al.

[11] Patent Number: 5,162,151
[45] Date of Patent: Nov. 10, 1992

[54] POLYPHENYLENE SULFIDE MONOFILAMENTS AND FABRICS THEREFROM

[75] Inventors: Gerald L. Smith, Summerville; Paul R. Cadmus, Spartanburg, both of S.C.

[73] Assignee: Hoechst Celanese Corporation, Somerville, N.J.

[21] Appl. No.: 645,083

[22] Filed: Jan. 23, 1991

[51] Int. Cl.⁵ ................................. D02G 3/00
[52] U.S. Cl. .................... 428/364; 428/224; 428/421
[58] Field of Search ............... 525/189; 428/364, 224, 428/373, 419, 421

[56] References Cited

U.S. PATENT DOCUMENTS

| | | | |
|---|---|---|---|
| 3,487,454 | 12/1969 | Oates et al. | 260/900 |
| 3,895,091 | 7/1975 | Short et al. | 264/210 |
| 4,421,588 | 12/1983 | Davies | 156/308 |
| 4,423,543 | 1/1984 | Leuvelink | 29/433 |
| 4,455,410 | 6/1984 | Giles, Jr. | 525/436 |
| 4,493,917 | 1/1985 | Bailleux et al. | 524/394 |
| 4,544,700 | 10/1985 | Wright | 524/543 |
| 4,610,916 | 9/1986 | Ballard | 428/224 |
| 4,629,654 | 12/1986 | Sasaki et al. | 428/364 |
| 4,748,077 | 5/1988 | Skinner et al. | 428/224 |
| 4,801,492 | 1/1989 | Skinner et al. | 428/224 |

FOREIGN PATENT DOCUMENTS 407887 7/1990 European Pat. Off. .

Primary Examiner—Patrick J. Ryan
Assistant Examiner—N. Edwards
Attorney, Agent, or Firm—R. H. Hammer, III

[57] ABSTRACT

A monofilament, and a fabric made, at least in part with that monofilament, is formed by a blend of two resins. The first resin is a melt extrudable polymer selected from the group consisting of copolymers of at least two halogenated monomers, for example, vinylidene fluoride and hexafluoropropylene. The second resin is polyphenylene sulfide.

6 Claims, No Drawings

POLYPHENYLENE SULFIDE MONOFILAMENTS AND FABRICS THEREFROM

FIELD OF THE INVENTION

Polyphenylene sulfide monofilaments and fabrics made therefrom comprise a blend of two resins, one is a polyphenylene sulfide and the other is a melt-extrudable copolymer consisting of at least two halogenated monomers.

BACKGROUND OF THE INVENTION

Due to the high level of crystallinity of polyphenylene sulfide (PPS), monofilaments thereof tend to be brittle and are difficult to work with. In particular, the knot strength, the loop strength, and the fatigue resistance of 100% PPS monofilaments are low and, thus, result in problems during the processing of the monofilaments, especially when a monofilament is woven into fabric. For example, when a 100% PPS monofilament is removed from the quill during weaving, twists and loops form which, when tightened, kink and result in filament breaks.

Nevertheless, PPS, because of its performance at elevated temperatures and its good chemical resistance, is believed to be a good candidate for fiber applications. In U.S. Pat. No. 3,895,091, a process for producing 100% PPS filaments is disclosed. High modulus, high melting, non-burning PPS fibers with good corrosion resistance properties were obtained.

PPS has been blended with such materials as polytetrafluoroethylene (PTFE), polyether ether ketone (PEEK), polyetherimide (PEI), low density polyethylene (LDPE), and certain other fluorocarbon polymers See U.S. Pat. Nos. 3,487,454; 4,421,588; 4,455,410; 4,493,917; and 4,544,700.

In U.S. Pat. No. 3,487,454, the moldability and extrudability of PPS resin is improved by the addition of polyfluorocarbon polymers to the PPS resin. The only polyfluorocarbon polymer disclosed is polytetrafluoroethylene (PTFE) resin. The PTFE resin is added in the range of 0.5 to 10 percent by weight of the PPS.

In U.S. Pat. No. 4,421,588, PPS is blended with polyether ether ketone (PEEK) to produce a plastic alloy suitable for use as a moldable bearing material, having a high fatigue strength and improved thermostability.

In U.S. Pat. No. 4,455,410, 1-99% by weight PPS is mixed with a 99-1% by weight polyetherimide (PEI) for the purpose of obtaining a molding grade material with good flexible strength and better mechanical properties than PPS alone.

In U.S. Pat. No. 4,493,917, chemical resistant fluorocarbon polymers are mixed with heat-stable polymers, such as PPS, in order to improve the mechanical properties of the fluorocarbon polymer used to make frames for electrochemical reaction cells. The fluorocarbon polymer forms an anti-corrosion barrier around the structural matrix formed by the PPS. The fluorocarbon polymers may be chosen from: polytetrafluoroethylene (PTFE) resins, such as "Soreflon 71" from PCUK Company; or dispersions of fusible, fluorinated copolymers, such as polyfluoroethylene, perfluorinated ethylene-propylene copolymer; or perfluoroalkoxy resin. The process for preparing the frames required two steps: preparing the blend by extrusion, and then producing the frame by molding.

In U.S. Pat. No. 4,544,700, PPS, when used as a matrix binder in carbon fiber or glass fiber composites, is mixed with a low density polyethylene (LDPE). The resulting composite has a reduced tendency to develop internal cracks within thick-walled parts.

Specific efforts directed at forming PPS into monofilaments, that may be subsequently woven into fabrics which are suitable for the harsh thermal and chemical environments encountered in the papermaking process, have investigated various additives that can improve PPS monofilaments. The additives are used, in part, to reduce the brittleness of PPS monofilaments by improving the loop strength, the knot strength, and the fatigue resistance of the monofilament. See U.S. Pat. Nos 4,610,916; 4,748,077; and 4,801,492.

In U.S. Pat. No. 4,610,916, PPS is mixed with copolymers comprising olefins and halogenated monomers for the purpose of reducing PPS monofilament brittleness. Reduced brittleness results in better loop strength, knot strength and abrasion resistance, however, the tensile strength is reduced somewhat. An exemplary copolymer is polyethylene-tetrafluoroethylene. Exemplary halogenated monomers include tetrafluoroethylene, fluorinated ethylene-propylene, chlorotrifluoroethylene, vinylidene fluoride, hexafluoropropylene, but specifically excluded are vinyl chloride, vinyl fluoride, and trifluorostyrene.

In U.S. Pat. Nos. 4,748,077 and 4,801,492, PPS is mixed with melt-extrudable polymers to form novel monofilaments. The melt-extrudable polymers are divided into four categories: (1) non-halogenated polymers and copolymers of olefins; (2) halogenated homopolymers; (3) ionomer resins; and (4) aromatic aliphatic polyamides and aliphatic aromatic polyamides. See U.S. Pat. No. 4,748,077, column 4, line 26—column 6, line 53 which is incorporated herein by reference. The second category, halogenated homopolymers are particularly relevant to the instant invention. Halogenated homopolymers, as defined, have from 2 to 8 carbon atoms and contain fluorine or chlorine or both as the halogen. Exemplary homopolymers include polyvinylidene fluoride, polyvinyl fluoride, polyvinyl chloride, polychlorotrifluoroethylene, as well as polymers of hexafluoropropylene.

In view of the above, there is a continuing need to improve the PPS resin blends used to manufacture PPS monofilaments.

SUMMARY OF THE INVENTION

A monofilament formed by a blend of two resins comprises: a melt extrudable polymer selected from the group consisting of copolymers of at least two halogenated monomers; and polyphenylene sulfide comprising the balance of the blend.

DETAILED DESCRIPTION OF THE INVENTION

The term "monofilament", as used herein, shall refer to any single filament of a manufactured fiber, usually of a denier higher than 14.

According to the present invention, monofilaments are prepared from a blend of PPS resin and a melt-extrudable copolymer selected from the group consisting of at least two halogenated monomers. The melt-extrudable copolymers are not added to improve the loop strength and knot the strength of the monofilament as was done in the most relevant art, U.S. Pat. Nos. 4,610,916; 4,748,077; and 4,801,492. But instead, they are added to improve the tensile strength and relative elongation of the monofilaments. Improvement of the tensile strength and relative elongation of the monofilaments is believed to produce better fabrics for the end uses disclosed herein.

The PPS material utilized in the monofilament of the present invention must be melt-extrudable. Suitable PPS materials are commercially available under the trade name: RYTON ® PPS resin from Phillips Chemical Company; and FORTRON ® PPS resin from the Hoechst Celanese Corporation. FORTRON ® PPS resin is preferred.

Specifically, two grades of FORTRON ® PPS may be used. FORTRON ® PPS SB300 has a melt viscosity of 3600 at 310° C. and 1200/sec. FORTRON ® PPS SB214 has a melt viscosity of 1200 at 310° C. and 1200/sec. Preferably, FORTRON ® PPS SB300 and FORTRON ® PPS SB214 comprised 69.25 and 29.25 percent by weight of the blend.

The second resin forming the monofilament comprises a melt-extrudable copolymer selected from the group consisting of copolymers of at least two halogenated monomers. For example, the copolymer of vinylidene fluoride and hexafluoropropylene, commercially available under the trade name KYNAR ® 2800 from Pennwalt Corporation is preferred. The melt-extrudable copolymer may comprise up to 5 percent by weight of the blend. Preferably, the melt-extrudable copolymer comprises approximately 1.5 percent of the material. Melt-extrudable copolymers exclude halogenated copolymers of olefin monomers, i.e., fluorinated ethylene-propylene.

With respect to the extrusion process, the monofilament is produced by extruding the blend of the two resins. The two resins, which have been mechanically mixed, are loaded into an extrusion hopper and from there fed into a single extruder. The melting and intimate blending of the resins takes place in the extruder at a temperature ranging from about 310° to 320° C. as the screw conveys the blend of resins forward. The molten and thoroughly blended resins reside in the extruder at pressures ranging from 75 to 80 kilograms per square centimeter (1,073 to 1,144 psig). The molten and thoroughly blended resins are fed into a metering pump which forces the molten resin through dye to form molten monofilaments.

The molten monofilament is quenched in the air or water bath to form the solid monofilaments. The solid filaments are drawn, preferably in a two stage process (where the first stage is hot water immersion stretching), at room temperature or elevated temperature up to about 100° C. to a ratio from about 3.0:1 to 6.0:1. Thereafter, in a third stage, the drawn monofilaments are heat set and are preferably allowed to relax about 2 percent. The finished monofilaments are then wound onto spools.

The fabric referred to herein is formed by weaving two filament systems, i.e., lengthwise yarn (warp) and crosswise yarn (fill), at least one of which is a monofilament system, in a repeated pattern. Possible patterns include the plain weave in which the filling yarn passes alternately over and under each warp yarn, the twill weave which is formed by interlacing warp and fill so that the filling yarn passes alternately over and under two or more warp yarns, and the satin weave which is formed so that there are more filling yarns on the face than on the inside of the fabric. Variations of these patterns are possible which include combinations of the basic patterns, in addition to these one layer fabrics, fabrics can be woven having two or more layers.

As will be appreciated by those skilled in the art, fabrics can be woven flat and then seamed to form an endless belt or can be woven as an endless belt so that no seam is necessary. It is to be understood that the monofilament of this invention can be used for part or all of the filaments in any of the fabrics described hereinabove. One suggested use for the fabrics of the present invention is in the paper industry where fabrics were originally made from metal wires. Metal wire fabrics, which fail due to flexure and metal fatigue, have been largely replaced by fabrics made from synthetic materials, such as polyester and nylon because the synthetic materials, which have better flexural behavior and do not fail easily due to bending failure, result in longer life-times for the belts.

In some environments, i.e., where high temperatures and corrosive chemicals are present, the ordinary synthetics are not suitable. For example, ordinary polyester monofilaments fail in these environments, high temperature and humidity, because of hydrolysis. Hydrolysis of polyester causes molecular weight loss due to chain scission and thus the polyester becomes brittle. Nylon monofilaments fail under these conditions because the wet modulus of the monofilaments causes a loss of dimensional stability. For this reason materials such as PPS which have good chemical and temperature resistance have been used with success in hostile environments. However, as discussed above, PPS alone is difficult to work with because it is very brittle. Fabrics prepared from the blends discussed herein may be constructed with no difficulty and have, therefore, substantially eliminated the problems encountered with PPS.

The known fabrics described hereinabove may be used for the most part on paper forming machines, in these instances, the fabrics are formed into endless belts which are in continuous motion on the paper machine as the paper is formed. It is to be understood that such fabrics also have applications for filter media in situations where the fabric is stationary. The fabrics described in the present invention are prepared from filaments with diameters ranging from 8 mils to 40 mils and have dimensions ranging from 10 to 400 inches wide (254 to 1016 cm) and from 100 to 300 feet long (30.5 to 91.5m). As indicated above, part of the fabric can comprise the novel monofilament, as warp or fill, or the fabric can be totally manufactured from the novel monofilament (warp and fill). Fabrics of this invention can be utilized on paper forming machines, as filter media and other applications.

PPS monofilament is particularly suited for spiraling end uses. Spiraling end uses refer to, for example, fabrics, made from spiraled monofilaments, that may be used in conveyor belts, lay belts, dryer fabrics for paper machines and the like. Spiraled monofilaments refer to the following, for example: A monofilament is passed through a spiraling machine in order to make an oval shaped spiral. In this spiraling machine the monofilament is heated and then wrapped around a mandrel of a specific shape. As new monofilament comes into the spiraling machine and is spiraled, the cooled monofilament wrapped around the mandrel is pushed off the end of the mandrel. These spiraled monofilament coils are then meshed together and a pintle yarn is passed through the intermeshed coils to form an interlocked structure. An entire fabric is constructed by building up the number of coiled structures that are fastened together by pintle yarns. In the open space between the pintle yarns it is possible to insert an additional monofilament in order to control the air permeability of the fabric. After the fabrics are made they are heat set in order to fix the dimensional stability. A fabric made from spiraled coils is attractive because it costs less than a woven fabric of similar dimensions. It is also possible to repair a defect in the fabric made from spiraled monofilaments by removing the pintle yarns on either side of the defect, removing the defective portion of the fabric, and inserting a new section in place of the part that was removed. See generally, U.S. Pat. No. 4,423,543 which discusses spiral fabrics, this patent is incorporated herein by reference.

The present invention can be more fully understood by reference to the following examples. These examples further illustrate the invention, but are in no way limiting upon the disclosure of the invention set forth hereinafter. All percentages are given in parts by weight unless otherwise noted:

EXAMPLES

Examples Nos. 1-3

A monofilament blend was produced by feeding a uniform mixture of 98.5 parts by weight PPS (69.25 parts by weight FORTRON® PPS SB300 and 29.25 parts by weight FORTRON® PPS SB214) and 1.5 parts by weight of the copolymer of the vinylidene fluoride and hexafluoropropylene (KYNAR® 2800) to the extruder. The extrusion pressures range from about 75 to about 80 kilograms per square centimeter (1073-1144 psig) and the extrusion temperatures range from about 310° to about 320° C. The result are set forth in Table 1.

Comparative Examples Nos. A-C

A monofilament was produced by feeding a uniform mixture of 89 parts by weight PPS (RYTON® PPS GR02 FIBER GRADE) and 11 parts by weight polyvinylidene fluoride (KYNAR® 720) to the extruder. The extrusion pressures range from about 75 to about 80 kilograms per square centimeter (1073-1144 psig) and the extrusion temperatures range from about 310° to about 320° C. The results are set forth in Table 1.

TABLE I

| EX. NO. | LOOP (Kgs) | KNOT Kgs) | TENACITY (Gms/Den) | HOT AIR SHRINK- AGE 200° C.) | RELATIVE ELON- GATION (@ 3 Gms/ Den) |
|---|---|---|---|---|---|
| (1) | — | — | 3.2 | 6.0 | 23.4 |
| (2) | 2.6 | 1.9 | 3.1 | 6.0 | 21.1 |
| (3) | 4.2 | 3.8 | 3.4 | 5.7 | 23.6 |
| (A) | 8.9 | 5.0 | 2.5 | 5.5 | * |
| (B) | 9.1 | 5.5 | 2.9 | 5.8 | * |
| (C) | 8.0 | 4.6 | 2.5 | 5.3 | * |

*Values too low to measure

The test procedures for "LOOP", "KNOT", "TENACITY", "HOT AIR SHRINKAGE", and "RELATIVE ELONGATION", used to prepare the information set forth in TABLE I, are as follows: All tensile strength testing is done on a Instron Tensile Tester model number 4201. Tenacity is measured by determining the breaking load in kilograms force and dividing this by the tex of the fiber. Relative elongation is determined by reading the elongation of the fiber at a load of 3 grams per denier. The loop tenacity is determined by making two "U shaped" loops and determining the breaking strength of these two loops in the tensile tester. The knot strength is determined by making an overhand knot in the monofilament and determining the breaking strength of the monofilament on the tensile tester. Hot air shrinkage is reported in percent, and it is the free shrinkage of the monofilament held in a circulating hot air oven for 15 minutes at 200° C.

We claim:

1. A monofilament formed by a blend of two resins comprising:
   a melt-extrudable copolymer consist of at least two distinct halogenated monomers, the blend comprising at most 5 parts by weight of said copolymer; and
   a polyphenylene sulfide comprising the balance of the blend.

2. The monofilament according to claim 1 wherein said copolymer comprises a copolymer consisting of vinylidene fluoride and hexafluoropropylene.

3. The monofilament according to claim 1 wherein said melt-extrudable copolymer comprises about 1.5 parts by weight of the blend.

4. A monofilament formed by a blend of two resins comprising:
   a melt-extrudable copolymer consisting of vinylidene fluoride and hexafluoropropylene, the blend comprising at most 5 parts by weight of said copolymer; and
   a polyphenylene sulfide comprising the balance of the blend.

5. A monofilament formed by a blend of two resins comprising:
   a melt-extrudable copolymer consisting of vinylidene fluoride and hexafluoropropylene, the blend comprising about 1.5 parts by weight of said copolymer; and
   a polyphenylene sulfide comprising the balance of the blend.

6. A fabric comprising the monofilament set forth in claims 1 or 2 or 3 or 4 or 5.

* * * * *